US010602735B2

(12) United States Patent
Swan et al.

(10) Patent No.: US 10,602,735 B2
(45) Date of Patent: Mar. 31, 2020

(54) WEED CONTROL

(71) Applicant: Weeding Technologies Limited, London (GB)

(72) Inventors: David Swan, Blyth Northumberland (GB); Brian Palmer, Blyth Northumberland (GB)

(73) Assignee: Weeding Technologies Ltd. (GB)

(*) Notice: Subject to any disclaimer, the term of this patent is extended or adjusted under 35 U.S.C. 154(b) by 467 days.

(21) Appl. No.: 15/329,157

(22) PCT Filed: Jul. 17, 2015

(86) PCT No.: PCT/GB2015/052081
§ 371 (c)(1),
(2) Date: Jan. 25, 2017

(87) PCT Pub. No.: WO2016/012767
PCT Pub. Date: Jan. 28, 2016

(65) Prior Publication Data
US 2017/0202203 A1 Jul. 20, 2017

(30) Foreign Application Priority Data
Jul. 25, 2014 (GB) .................................. 1413214.6

(51) Int. Cl.
A01M 21/04 (2006.01)
(52) U.S. Cl.
CPC ................... A01M 21/04 (2013.01)
(58) Field of Classification Search
CPC .. A01M 21/04; A01M 21/043; A01M 7/0007; B05B 9/002; B05B 1/24;
(Continued)

(56) References Cited

U.S. PATENT DOCUMENTS 2,345,614 A * 4/1944 Malsbary ................ B60S 3/044
126/271.1
5,385,106 A * 1/1995 Langshaw .............. A01G 11/00
111/118
(Continued)

FOREIGN PATENT DOCUMENTS

GB 2485460 5/2012
KR 20120075750 7/2012
(Continued)

OTHER PUBLICATIONS

International Search Report and Written Opinion for Application No. PCT/GB2015/052081 dated Oct. 10, 2015.
(Continued)

Primary Examiner — Arthur O. Hall
Assistant Examiner — Tuongminh N Pham
(74) Attorney, Agent, or Firm — Tumey L.L.P.

(57) ABSTRACT

An apparatus (10) comprises a water storage tank (14), a heater (16), a pump (38) and an outlet duct (70) to convey heated water to a plurality of lances (24) through hoses (22). The heater (16) is arranged to heat the water in at least two successive stages (66, 67), to an intermediate and then to a final temperature, at least the second stage (67) of the heater being activated in pulses, the frequency and/or duration of the pulses being adjustable to control the resultant temperature. Foaming agent is introduced (18, 40) into the water. Upstream of each hose (22) is a diversion valve (85) connecting to a water return circuit (54) leading back to the water storage tank (14); and the water return circuit (54) includes a heat exchanger (55, 56). The heater (16) may be liquid fuelled. The apparatus can be mobile, for example on a motor-vehicle (12), and it enables a number of people to control weeds separately, using separate lances (24), from the same apparatus (10).

14 Claims, 2 Drawing Sheets

Figure 1:
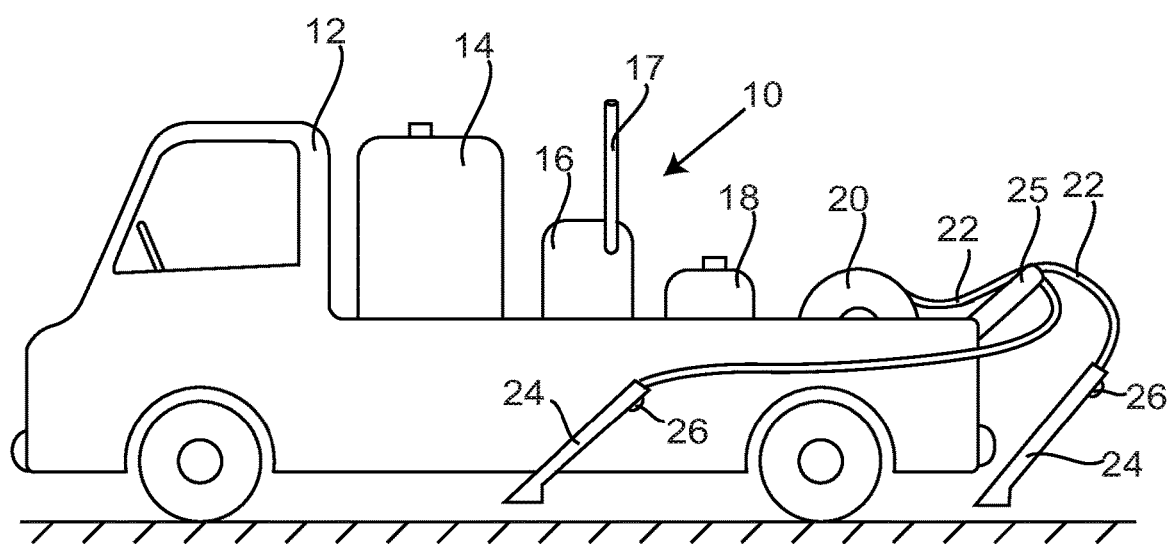

(58) Field of Classification Search
CPC ..... B05B 7/1693; B05B 7/1626; B05B 3/001;
B05B 5/001; B05B 11/0002; B05B 12/10;
B05B 14/00; B08B 3/026; B08B
2203/007
USPC ....... 239/172, 128, 130, 135, 131, 124–127;
222/318
See application file for complete search history.

(56) References Cited

U.S. PATENT DOCUMENTS

| | | | | |
|---|---|---|---|---|
| 5,575,111 | A * | 11/1996 | Rajamannan | A01M 21/04 43/138 |
| 6,435,424 | B1 * | 8/2002 | Pauley | B08B 3/026 239/128 |
| 2005/0143259 | A1 | 6/2005 | Newson | |
| 2005/0258269 | A1 * | 11/2005 | Schmidt | B29B 7/7404 239/124 |
| 2010/0160201 | A1 * | 6/2010 | Scheuing | C11D 3/48 510/180 |
| 2011/0036418 | A1 * | 2/2011 | Hendy | B08B 3/02 137/335 |

FOREIGN PATENT DOCUMENTS

| | | |
|---|---|---|
| NL | 1018458 | 1/2003 |
| NZ | 532571 | 5/2007 |
| WO | 94/26102 | 7/1993 |
| WO | 94/05429 | 10/1993 |
| WO | 02/07513 | 1/2002 |
| WO | 2010/106024 | 9/2010 |

OTHER PUBLICATIONS

GB Search Report for GB Application No. GB1512606.3 dated Jan. 12, 2016.
GB Search Report for GB Application No. GB1413214.6 dated Jan. 12, 2015.

* cited by examiner

WEED CONTROL

The present invention relates to a method of controlling vegetation and to an apparatus for performing the method.

Conventionally, vegetation such as weeds is controlled either by physical removal, such as hand weeding, or by the use of herbicides. Hand weeding can be very hard work; but plants are becoming increasingly resistant to herbicides. In addition, there is increasing public resistance to the use of chemicals in the environment, and legislative changes to reduce use of toxic chemicals as herbicides. Therefore there is an interest in methods of controlling vegetation which do not use synthetic chemicals and which avoid hand weeding.

Thermal methods have been suggested for weed control. A variety of methods have been used to provide heat to weeds, for example, hot water, steam, hot air, flames and hot foam. These methods can overcome some of the disadvantages of herbicides such as spray drift and soil or groundwater pollution. WO 02/07513 (Waipuna International) describes a process for weed control by application of hot foam, in which hot liquid containing a foaming agent is supplied to an applicator head, and air is supplied from a blower through a hose, so a hot foam is created. The hot liquid and air may be supplied to a nozzle within a shroud. However, to obtain hot foam, the air will either lower the temperature of the foam, or it will be necessary to preheat the air, which adds complexity to the equipment.

The present invention aims to improve a mobile apparatus for use in controlling vegetation. It enables a plurality of people to control weeds separately, using separate lances, from the same apparatus. Under such circumstances problems can arise if one person switches off their lance but the other lance or lances continue in use. Such problems may be resolved by the present invention.

The present invention provides an apparatus suitable for controlling vegetation by a plurality of operators, the apparatus comprising a water storage tank; a heater; a pump to transfer water from the water storage tank to the heater; an injector to introduce a foaming agent into the water; an outlet duct to convey heated water from the heater; and at least two outlet hoses each communicating with the outlet duct and each connected to a respective dispensing lance; wherein the heater is arranged to heat the water in at least two successive stages, to an intermediate temperature and then to a final temperature, at least the second stage of the heater being activated in pulses, the frequency and/or duration of the pulses being adjustable to control the resultant temperature of the water;
and wherein upstream of each outlet hose is a diversion valve, each diversion valve connecting to a water return circuit leading back to the water storage tank; and the water return circuit includes a heat exchanger.

The heater is preferably not mains powered, as this would not be convenient in a mobile device. The heater may be battery-powered, or provided with a liquid fuel. The use of a liquid-fuelled heater, such as a diesel-fuelled heater, enables the vegetation-controlling apparatus to be mounted on a vehicle such as a van or pick-up, as no mains electricity is required. It has been found that heating the water in a plurality of successive stages, at least the last stage involving pulse control of the heater, enables the water temperature to be accurately controlled, despite variations in flow rate and initial temperature.

Preferably the apparatus also includes a control valve responsive to measurements of temperature, for example a temperature-sensitive valve, to ensure that water is supplied to the hoses only when the water is at the desired temperature, and a pressure relief valve communicating with the outlet duct upstream of the temperature-sensitive valve, and connecting to the water return circuit. Until such time as the heater heats the water to the desired temperature, the water will be recirculated through the pressure relief valve back to the water storage tank, but when the water reaches the desired temperature the control valve will open, and the resulting hot water will be supplied to the hoses. The opening of the control valve reduces the pressure, so the pressure relief valve will close.

The apparatus includes a controller, which may for example be a microprocessor. The water return circuit may include a flow sensor, which provides a signal to the controller, so the controller can modify operation of the apparatus to allow for the hot water being returned to the water storage tank. In particular this may involve activating a fan to cool the heat exchanger in the water return circuit.

The apparatus may also include a sensor to detect if each of the lances is switched off, so there is no hot water emerging from the lances. Under these circumstances the controller may adjust the operation of the apparatus, for example to significantly reduce the heat input from the heater. This sensor may be a pressure sensor upstream of the hoses.

Each diversion valve may be a medium pressure relief valve, and may be a regulating valve. For example when each of the dispensing lances are in use, each diversion valve may allow no more than 10% of the water flow in the outlet duct to pass through the diversion valve, more preferably between 2% and 8% of the water flow, for example 5%; but if one of the dispensing lances is turned off then the resultant pressure rise causes the corresponding diversion valve to open further, allowing a significantly higher proportion of the water flow to pass, ideally 50% if there are two dispensing lances. A regulating valve can be used to control the pressure to a set point, rather than only to relieve excess pressure. For example a pressure regulating valve may comprise three functional elements: a pressure-reducing or restrictive element such as a poppet valve; a sensing element such as a diaphragm or piston; and a reference force element such as a spring. So in one example the spring acts on the diaphragm in the opposite direction to the fluid pressure, and the diaphragm is linked to the flow restriction valve so that if the pressure changes, the valve alters the fluid flow. One design of regulating valve is for example a model C46 bypass pressure regulating valve from Wanner Engineering Inc.

By way of example the foaming agent may include a small proportion of xanthan gum, which may assist in increasing tackiness, so the resulting foam tends to stick to the vegetation; a glutamic acid-based chelating agent, to sequester any polyvalent ions such as calcium ions which might otherwise inhibit foam formation; and a mixture of two different alkyl polyglucosides (APG), for example a shorter chain length APG, C8-C10, to efficiently wet the surface; and an APG of a wider range of chain lengths, for example C8-C14, to enhance foam formation. APGs are well known as surfactants, aqueous solutions of APGs forming foams; such APGs are available for example from Cognis™.

It will be appreciated that all of these foaming agent components are naturally-occurring compounds, or are based on naturally-occurring compounds; and that they are readily broken down by microorganisms in the environment, so they do not cause contamination.

Figure 2:
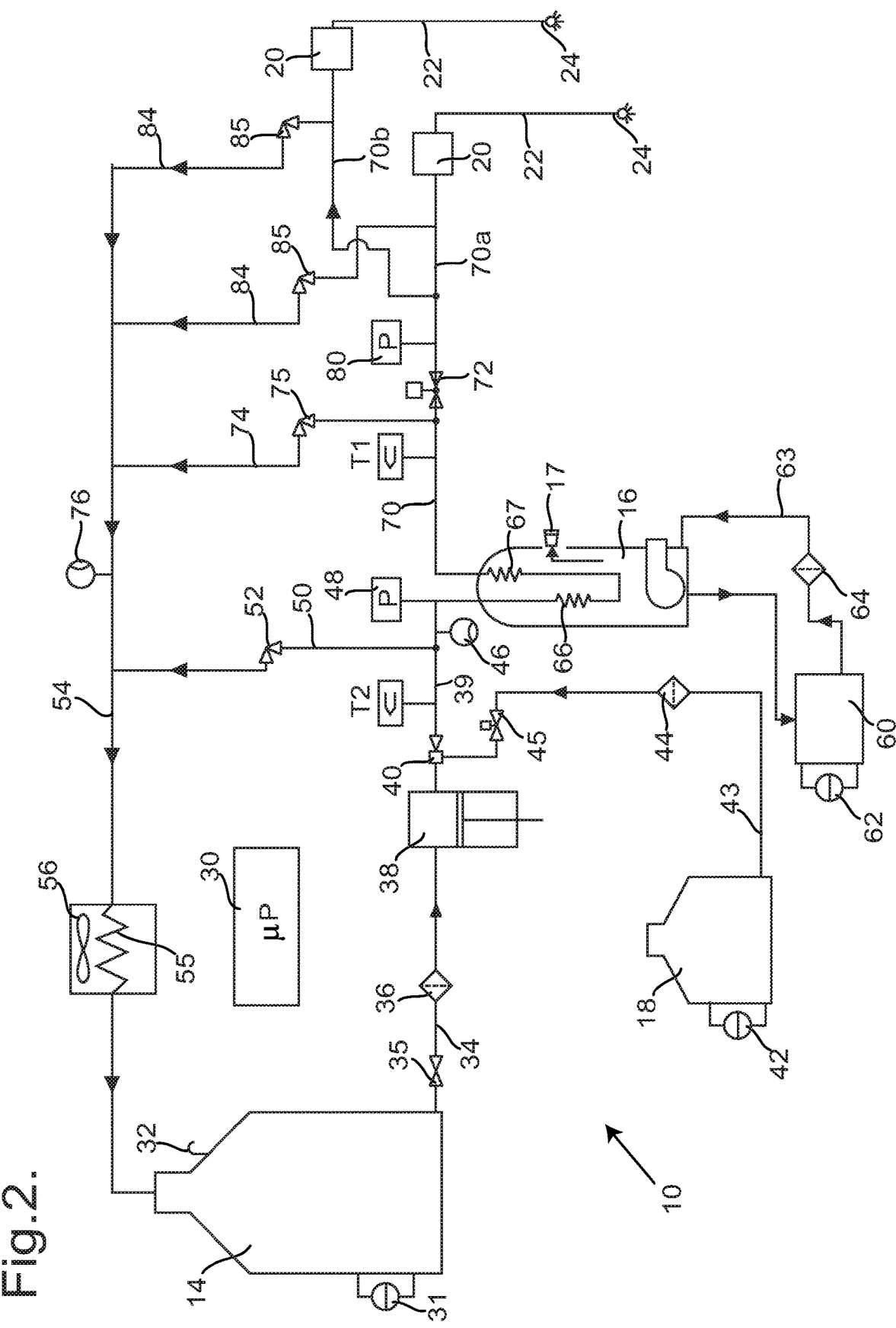

The invention will now be further and more particularly described, by way of example only, and with reference to the accompanying drawings in which:

FIG. 1 shows a side view of a pickup truck carrying a weed control apparatus of the invention; and FIG. 2 shows a flow diagram of the weed control apparatus of FIG. 1.

Referring to FIG. 1, a weed control apparatus 10 is carried on the back of a pickup truck 12. The apparatus 10 includes a water storage tank 14, a diesel-fuelled water heater 16 with an exhaust pipe 17, a foaming-agent storage tank 18 and two hose reels 20 (only one is shown in FIG. 1) side-by-side near the rear of the pickup truck 12. Each hose reel 20 carries a flexible hose 22, connected to a lance 24 at its other end. Each flexible hose 22 may be of length up to 50 m. A hose guide 25 projects from the rear of the pickup truck 12. In use the operators would pull out the hoses 22 from the hose reels 20 over the hose guide 25, pulling out sufficient length that they can reach the areas where weed killing is required, and the two lances 24 can then be operated separately by two operators. Each lance 24 includes a control trigger 26.

In operation the foaming agent is introduced into water from the water storage tank 14 that is heated by the water heater 16, and is fed through the hoses 22 to the lances 24. When the operator actuates the control trigger 26, hot foam emerges from the lance 24. By way of example the hot foam may be at a temperature above 80° C., preferably above 90° C., for example at 96° C., as it emerges from the lance 24. The hot foam kills weeds with which it comes in contact. Hence the operators can control weeds over a large area, before having to move the pickup truck 12. In one example the flow rate of water is at least 9 L/min through each hose 22, and may be 10 L/min or 12 L/min.

Referring now to FIG. 2, this shows a flow diagram for the weed control apparatus 10. The weed control apparatus 10 operates under the control of a controller 30 that may be a microprocessor, and which receives data from sensors, and controls operation of other components. The water storage tank 14 has a low level sensor 31 and an overflow duct 32, and an outflow duct 34 including a tank valve 35 and a water filter 36. The filtered water is provided to a pump 38, which pumps the water along a duct 39 to the water heater 16 through a venturi injector 40. The foaming-agent storage tank 18 also has a low level sensor 42; and it is connected via a feed duct 43 including a filter 44 and a solenoid valve 45 to the venturi injector 40, so as water is pumped through the venturi injector 40 the foaming agent is sucked through the feed duct 43 and mixed with the water, as long as the solenoid valve 45 is open.

Between the venturi injector 40 and the water heater 16 there is a temperature sensor T2, a flow sensor 46 and a pressure sensor 48, all connected to the duct 39, to monitor the flowing water. In addition there is a pressure relief duct 50 connected to the duct 39, the pressure relief duct 50 incorporating a high-pressure relief valve 52, and connecting to a water return circuit 54 that leads back to the water storage tank 14. The water return circuit 54 includes a heat exchanger in the form of a radiator 55 in combination with a fan 56.

In operation, the signals from the temperature sensor T2, the flow sensor 46 and the pressure sensor 48 are all provided to the controller 30. If there were to be a blockage in the water heater 16, this would be detected either by an increase in pressure as sensed by the pressure sensor 48 or a decrease in flow as detected by the flow sensor 46; and in either case the controller 30 may stop the operation of the water heater 16. The high-pressure relief valve 52 is arranged to open if the water pressure exceeds a safety limit (for example 40 bar=4.0 MPa), so the pressure is relieved, and the excess water can return to the water return circuit 54.

The water heater, in this example, 16 is fuelled by a liquid fuel such as diesel, stored in a liquid fuel tank 60. The tank 60 includes a low level sensor 62. The liquid fuel is supplied to the water heater 16 through a fuel supply duct 63 that includes a fuel/water separator 64. The water heater 16 heats the water in two stages, indicated by 66 and 67. The first stage 66 is arranged to raise the temperature of the water (at a normal flow rate, for example 12 L/min) by about 55° or 60° C., and operates continuously during normal operation. The second stage 67 operates in a pulsed fashion, on a short time cycle, typically the cycle being less than 10 seconds. For example the time cycle may be 8 seconds; the second stage is pulsed on for a time period t1 which is a fraction of the time cycle. For example it may be pulsed on for 4 s (i.e. t1=4 s). The heat is generated by combustion of the liquid fuel, and the resulting exhaust gases are vented through the exhaust pipe 17.

The heated water emerges through an outflow duct 70, and there is a temperature sensor T1 just downstream of the water heater 16, which provide signals to the controller 30. The controller 30 can control the temperature of the water, for example to maintain a substantially constant temperature of 102° C. at the temperature sensor T1, by adjusting the time period t1 for which the second stage 67 is on, as the time period t1 is a continuous variable. The controller 30, in the course of operation, ascertains what time period t1 is required to achieve the desired temperature at the temperature sensor T1, in accordance with the monitored temperature T2 of the inflowing water, so this can be used as an initial preset, for example when starting up, and then adjusted.

Downstream of the temperature sensor T1 is a control valve 72 which is activated in response to the temperature measured by the temperature sensor T1, the control valve 72 remaining closed until the temperature measured by the temperature sensor T1 reaches a preset value (such as 102° C.). Upstream of the control valve 72 there is a pressure relief duct 74 connected to the outflow duct 70, the pressure relief duct 74 incorporating a medium-pressure relief valve 75, and connecting to the water return circuit 54 that leads back to the water storage tank 14. The medium-pressure relief valve 75 is arranged to open if the water pressure exceeds a normal operating value (for example 20 bar=2.0 MPa), so while the control valve 72 is closed the heated water can return to the water storage tank 14.

Downstream of the control valve 72 is a pressure sensor 80 connected to the outflow duct 70, and downstream of the pressure sensor 80 the outflow duct 70 divides into two outflow ducts 70a and 70b that lead respectively to the two hose reels 20 and so to the two hoses 22. A short distance upstream of each hose reel 20 is a pressure relief duct 84 connected to the respective outflow duct 70a or 70b, each pressure relief duct 84 incorporating a regulating valve 85, and connecting to the water return circuit 54. In each case the regulating valve 85 is set so that as long as the water pressure has its normal operating value, for example 12 bar (1.2 MPa), a small amount of water, such as 10% of the flow through the respective outflow duct 70a or 70b, flows through the pressure relief duct 84; but that the regulating valve 85 will open to allow substantially all of the flow through respective outflow duct 70a or 70b to flow through the pressure relief duct 84 if the water pressure rises above the normal operating pressure. The water return circuit 54 includes a flow sensor 76 arranged to sense the flow of heated water, whether from the pressure relief duct 74 or from either of the pressure relief ducts 84, and to provide a signal to the controller 30. Hence under normal operation, if both the lances 24 are in use and the flow is the same through each of the lances 24, about 5% of the total water flow through the control valve 72 passes through each of the regulating valves 85.

Thus, in use, the controller 30 receives signals representing liquid levels from the low level sensor 31, the low level sensor 42 and a low level sensor 62; it receives signals representing temperature from the temperature sensors T1 and T2; it receives pressure signals from the pressure sensors 48 and 80; and it receives flow signals from the flow sensors 46 and 76. The controller 30 can therefore provide control signals to the pump 38, to the solenoid valve 45, the water heater 16, the control valve 72, and to the fan 56. When operation is initiated, the control valve 72 is initially closed, and water is circulated by the pump 38 through the water heater 16 and the medium-pressure relief valve 75. If the water temperature measured by the sensor T2 becomes warm, say above 35° C., the fan 56 may be activated to cool the recirculated heated water. When the heated water reaches the desired temperature, as measured by the temperature sensor T1, the control valve 72 is opened, so the water can be dispensed by the operators through the lances 24. The water is mixed with air in the lance 24, and because of the presence of the foaming agent it forms a foam that blankets and kills the weeds. Typically the foam, as initially dispensed, is at a temperature of at least 90° C., for example 95° C.

If the operators turn off both the lances 24, the pressure sensor 80 senses a large increase in pressure, and the controller 30 transitions the pump 38 and the water heater 16 into a minimal power state. On the other hand, if only one operator turns off his lance 24, the pressure sensor 80 senses a smaller increase in pressure, and it may not be necessary to change the operation of the pump 38 or of the water heater 16. In either case, if the water pressure in one or both of the outflow ducts 70a and 70b exceeds the normal pressure (1.2 MPa for example) then the excess water is fed back through the or each pressure relief duct 84 to the water return circuit 54. If both the lances 24 have been turned off, and one or both are then switched on, then the pressure sensor 80 senses a sudden decrease in pressure, and the controller 30 restarts normal operation of the pump 38 and the water heater 16.

This arrangement minimises the need to make sudden or abrupt changes to the operation of the water heater 16, despite sudden changes in the overall flow rate as the lances 24 are turned on or off by the operators. The maximum acceptable temperature of the water from the water storage tank 14, as measured by the temperature sensor T2, is 40° C.; under those circumstances, since the first stage 66 raises the temperature by between 55° and 60° C., the water temperature after the first stage 66 is still below the required temperature. Using the fan 56 when hot water is being returned to the water storage tank 14 enables much of the excess heat to be dissipated, so the water temperature in the water storage tank 14 can be maintained below 40°, preferably below 35° C.

It will be appreciated that the weed control apparatus 10 described above may be modified in various ways while remaining within the scope of the present invention, as defined by the claims. For example there might be three lances 24 attached to three hoses 22, instead of the two lances 24 shown in the figures. There might be a single pressure relief duct 84 incorporating the regulating valve 85, and serving both the outlet ducts 70a and 70b. The heater 16 may be powered by a different liquid fuel, such as bioethanol, or may be powered electrically, for example from a battery.

What is claimed:

1. An apparatus suitable for controlling vegetation by a plurality of operators, the apparatus comprising a water storage tank; a heater; a pump to transfer water from the water storage tank to the heater; an injector to introduce a foaming agent into the water; an outlet duct to convey heated water from the heater; and at least two outlet hoses each communicating with the outlet duct and each connected to a respective dispensing lance, such that in use, when initiated by an operator, the heated water is mixed with air in the lance to form hot foam, which emerges from the lance;

wherein the heater is arranged such that as water is passed through the heater it is heated to a final temperature by both a first stage heater that is activated continuously and a second stage heater that is activated in pulses, the frequency and/or duration of the pulses being adjustable to control the final temperature of the water, the final temperature being sufficiently high that the hot foam is at a temperature above 90° C. as it emerges from the lance;

and wherein upstream of each of said at least two outlet hoses is a respective diversion valve, each said diversion valve connecting to a water return circuit leading back to the water storage tank, wherein each said diversion valve is a regulating valve and, when each of the dispensing lances are in use, each said diversion valve allows at least 2% but no more than 10% of the water flow in the outlet duct to pass through the said diversion valve to reach the water return circuit; and the water return circuit includes a heat exchanger configured as a radiator to remove heat from water in the water return circuit.

2. An apparatus as claimed in claim 1 also comprising a control valve responsive to a temperature of water in the outlet duct from the heater, to ensure that water is supplied to the hoses only when the water is at a desired temperature, and a pressure relief valve communicating with the outlet duct upstream of the control valve, and connecting to the water return circuit.

3. An apparatus as claimed in claim 1 comprising a controller, wherein the water return circuit includes a flow sensor to provide a signal to the controller.

4. An apparatus as claimed in claim 1 also comprising a fan configured to be activated to cool the water passing through the heat exchanger in the water return circuit.

5. An apparatus as claimed in claim 1 also comprising a sensor to detect if each one of the lances is switched off, so there is no hot water emerging from the lances.

6. An apparatus as claimed in claim 5 wherein the sensor to detect if each one of the lances is switched off is a pressure sensor upstream of the hoses.

7. An apparatus as claimed in claim 1 wherein, when each of the said dispensing lances are in use, each said diversion valve allows between 2% and 8% of the water flow in the outlet duct to pass through the said diversion valve.

8. An apparatus as claimed in claim 1 wherein the foaming agent comprises xanthan gum; a glutamic acid-based chelating agent; and a mixture of two different alkyl polyglucosides (APG).

9. An apparatus as claimed in claim 1 that incorporates said at least two lances connected to said at least two outlet hoses, wherein the apparatus is mounted on a motor-vehicle.

10. An apparatus as claimed in claim 1 wherein the heater is liquid fuelled.

11. An apparatus as claimed in claim 1 wherein the final temperature is sufficiently high that the hot foam is at a temperature of 95 or 96° C. as it emerges from the lance.

12. An apparatus as claimed in claim 1 wherein the final temperature is 102° C.

13. Weed killing apparatus for controlling vegetation by a plurality of operators, the apparatus comprising a water storage tank; a heater; a pump to transfer water from the water storage tank to the heater; an injector to introduce a foaming agent into the water; an outlet duct to convey heated water from the heater; and at least two outlet hoses each communicating with the outlet duct and each connected to a respective dispensing lance, such that in use, when initiated by an operator, the heated water is mixed with air in the lance to form hot foam, which emerges from the lance;

wherein the heater is arranged such that as water is passed through the heater it is heated to a final temperature by both a first stage heater that is activated continuously and a second stage heater that is activated in pulses, the frequency and/or duration of the pulses being adjustable to control the final temperature of the water, the final temperature being sufficiently high that the hot foam is at a temperature above 90° C. as it emerges from the lance;

and wherein upstream of each of said at least two outlet hoses is a respective diversion valve, each said diversion valve connecting to a water return circuit leading back to the water storage tank, wherein each said diversion valve is a regulating valve and, when each of the dispensing lances are in use, each said diversion valve allows a minor proportion of the water flow in the outlet duct to pass through the said diversion valve to reach the water return circuit;

and the water return circuit includes a heat exchanger configured as a radiator to remove heat from water in the water return circuit.

14. A weed killing apparatus as claimed in claim 13 wherein the minor proportion is no more than 10%.

\* \* \* \* \*